US012789750B2

(12) United States Patent
Lee

(10) Patent No.: US 12,789,750 B2
(45) Date of Patent: Nov. 10, 2026

(54) APPARATUS AND METHOD FOR CONTROLLING VEHICLE FOR EMERGENCY START

(71) Applicants: Hyundai Motor Company, Seoul (KR); Kia Corporation, Seoul (KR)

(72) Inventor: Jeong Kee Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 146 days.

(21) Appl. No.: 18/383,271

(22) Filed: Oct. 24, 2023

(65) Prior Publication Data

US 2024/0425013 A1 Dec. 26, 2024

(30) Foreign Application Priority Data

Jun. 23, 2023 (KR) ........................ 10-2023-0081289

(51) Int. Cl.

*B60R 25/24* (2013.01)
*B60R 25/34* (2013.01)
*B60W 40/08* (2012.01)

(52) U.S. Cl.

CPC ............ *B60R 25/241* (2013.01); *B60R 25/34* (2013.01); *B60W 2040/0881* (2013.01)

(58) Field of Classification Search

CPC ................. B60R 25/241; B60R 25/34; B60W 2040/0881

See application file for complete search history.

(56) References Cited

U.S. PATENT DOCUMENTS

2011/0109432 A1* 5/2011 Kim ........................ B60R 25/00 340/5.64
2016/0140785 A1* 5/2016 Lee ........................ B60R 25/30 701/2
2021/0095756 A1* 4/2021 Mendoza-Vega ...... B60K 20/06
2022/0198849 A1* 6/2022 Oh ..................... G07C 9/00309
2023/0227002 A1* 7/2023 Smith ................... B60R 25/255 340/426.31

FOREIGN PATENT DOCUMENTS

DE 102007021229 A1 * 11/2008 ............ B60R 25/24

* cited by examiner

*Primary Examiner* — Scott A Browne
*Assistant Examiner* — Josephine Rich
(74) *Attorney, Agent, or Firm* — Fox Rothschild LLP

(57) ABSTRACT

An apparatus and method are arranged to control a vehicle for an emergency start when an occupant is seated in a driver's seat. The apparatus includes a sensor for determining whether a door is open and the occupant is seated, where the vehicle applies power to an immobilizer coil to recognize a key fob, upon determining that the occupant is seated in the driver's seat, in order to carry out the emergency start. The vehicle outputs a message to verify that the occupant is the vehicle owner before carrying out the emergency start.

19 Claims, 11 Drawing Sheets

APPARATUS AND METHOD FOR CONTROLLING VEHICLE FOR EMERGENCY START

CROSS-REFERENCE TO RELATED APPLICATION

This application claims under 35 U.S.C. § 119 (a) the benefit of Korean Patent Application No. 10-2023-0081289, filed in the Korean Intellectual Property Office on Jun. 23, 2023, the entire contents of which are incorporated herein by reference.

BACKGROUND

(a) Technical Field

The present disclosure relates to an apparatus and method for controlling a vehicle for an emergency start, more particularly, to the apparatus and method capable of carrying out the emergency start using a mechanical key provided in a key fob.

(b) Description of the Related Art

A key fob may transmit or receive authentication information through a low frequency (LF) communication and a radio frequency (RF) communication together with a vehicle to recognize a user having the key fob, to open or close a door or a trunk of a vehicle, to start the vehicle, and to provide a link service to a portable terminal.

When communication between the key fob and the vehicle has failed, an immobilizer coil provided in a start button is applied with power, and a user is allowed to press the start button using the key fob, such that the power applied to the immobilizer coil allows an immobilizer to operate a transponder of the key fob. Accordingly, the key fob transmits authentication information to the vehicle. The vehicle performs the emergency start when the key fob is authenticated based on the authentication information.

Meanwhile, recently, an electronic shift by wire (SBW) lever in a column type has been applied between the start button and a transmission knob, such that the moving line between a steering wheel and a transmission is reduced, and the space between a driver seat and a passenger seat is effectively used. The electronic SBW lever (serving as a gear) in the column type is provided at one side of the steering wheel together with a turn signal provided in the steering wheel.

As the start button is realized in the electronic SBW lever in the column type, it becomes difficult to incorporate the immobilizer coil into the start button. Accordingly, the immobilizer coil may be provided in a separate place, which makes it difficult to apply a technique of performing the emergency start by pressing the start button using the key fob. Accordingly, there has been needed to improve technology for enabling an emergency start, when the start button is applied to the electronic SBW lever in the column type.

SUMMARY

The present disclosure provides an apparatus and a method for controlling a vehicle, capable of applying power to an immobilizer coil, when an occupant condition of an occupant is satisfied in a vehicle in which a start button is applied to an electronic shift-by-wire (SBW) lever in a column type, such that the key fob is recognized, thereby performing an emergency start.

Another aspect of the present disclosure is to provide an apparatus and a method for controlling a vehicle, capable of outputting theft warning, and transmitting a message related to theft, such that a vehicle owner perceives a vehicle state, when a door is unlocked by a mechanical key in the vehicle in which a start button is applied to an electronic shift-by-wire (SBW) lever in a column type.

Another aspect of the present disclosure is to provide an apparatus and a method for controlling a vehicle, capable of performing an emergency start only when the verification of a vehicle owner is completed by outputting a theft warning, and transmitting a message related to the theft, such that the verification of a vehicle owner is completed, in the situation that a door is unlocked by a mechanical key in the vehicle in which a start button is applied to an electronic shift-by-wire (SBW) lever in a column type and the door is open The technical problems to be solved by the present disclosure are not limited to the aforementioned problems, and any other technical problems not mentioned herein will be clearly understood from the following description by those skilled in the art to which the present disclosure pertains.

According to an embodiment of the present disclosure, an apparatus for controlling a vehicle, may include at least one sensor to acquire information related to a door and information related to a seat, and a processor to unlock the door by a mechanical key, determine the door as being open based on the information related to the door, and apply power to an immobilizer coil to recognize a key fob, when determining an occupant seated as being sensed at a driver seat, based on the information related to the seat.

According to an embodiment, the mechanical key may be provided in the key fob, and configured to be inserted into a key inserting hole of the vehicle and then turned, such that the door is unlocked.

According to an embodiment, the processor may output an announcement message for an emergency start, when the occupant seated is sensed at the driver seat.

According to an embodiment, the processor may determine whether a start button is input, when the key fob is determined as being recognized, as power is applied to the immobilizer coil.

According to an embodiment, the start button is provided in an electronic Shift by Wire (SBW) lever in a column type, which is provided at one side of a steering wheel.

According to an embodiment, the processor may control to start an engine, when the start button is determined as being input.

According to an embodiment, the processor may output a theft warning for the vehicle, when the door is determined as being unlocked by the mechanical key and then open, and transmit a message related to the theft to at least one of a terminal, a server, or a combination thereof.

According to an embodiment, the processor may determine whether verification of a vehicle owner is completed within a specific time, after the message related to the theft is transmitted.

According to an embodiment, the processor may determine whether an engine of the vehicle is started, depending on whether the verification of the vehicle owner is completed.

According to an embodiment, the processor may output a message for the verification of the vehicle owner, when the verification of the vehicle owner is not completed.

A vehicle may include the above-described apparatus.

According to an embodiment of the present disclosure, a method for controlling a vehicle, may include acquiring information related to a door and information related to a seat, and unlocking the door by a mechanical key, and determining the door as being open, based on the information related to the door, and applying power to an immobilizer coil to recognize a key fob, when determining an occupant seated as being sensed at a driver seat, based on the information related to the seat.

According to an embodiment, the mechanical key may be provided in the key fob, and configured to be inserted into a key inserting hole of the vehicle and then turned, such that the door is unlocked.

According to an embodiment, the method may further include outputting an announcement message for an emergency start, when the occupant seated is sensed at the driver seat.

According to an embodiment, the method may further include determining whether a start button is input, when the key fob is determined as being recognized, as power is applied to the immobilizer coil.

According to an embodiment, the start button is provided in an electronic Shift by Wire (SBW) lever in a column type, which is provided at one side of a steering wheel.

According to an embodiment, the method may further include controlling to start an engine, when the start button is determined as being input.

According to an embodiment, the method may further include outputting a theft warning for the vehicle, when the door is determined as being unlocked by the mechanical key and then open, and transmitting a message related to theft to at least one of a terminal, a server, or the combination thereof.

According to an embodiment, the method may further include determining whether verification of a vehicle owner is completed within a specific time, after the message related to the theft is transmitted.

According to an embodiment, the method may further include determining whether an engine of the vehicle is started, depending on whether the verification of the vehicle owner is completed.

According to an embodiment, the method may further include outputting a message for the verification of the vehicle owner, when the verification of the vehicle owner is not determined as being completed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
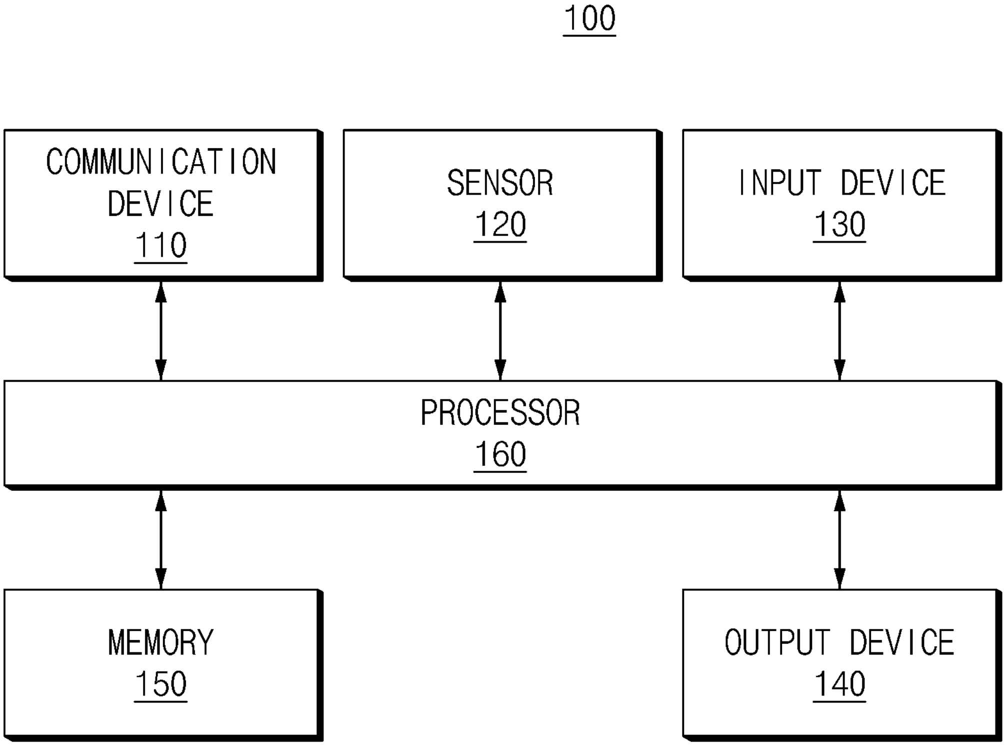
FIG. 1 is a view illustrating the configuration of an apparatus for controlling a vehicle, according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In describing the components of the embodiment according to the present disclosure, terms such as first, second, “A”, “B”, “(a)”, “(b)”, and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating the configuration of an apparatus for controlling a vehicle, according to an embodiment of the present disclosure;

As illustrated in FIG. 1, according to an embodiment of the present disclosure, an apparatus (vehicle controlling apparatus) 100 for controlling a vehicle may include a communication device 110, a sensor 120, an input device 130, an output device 140, a memory 150, and a processor 160.

The communication device 110 may include a transceiver to transmit or receive information through an antenna, a communication circuit, or a communication processor, and make wireless communication with at least one of a portable terminal, a server, or the combination thereof through various wireless communication schemes including WiFi, Wibro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), or Long Term Evolution (LET).

The sensor 120 may acquire information related to a door and information related to a seat. According to an embodiment, the sensor 120 may include a door sensor to sense an open signal of a door or a close signal of the door, and a door lock sensor to sense the movement of a locking member to lock or unlock the door. According to an embodiment, the processor 160 may determine an open state, a close state, a locked state, or an unlocked state of the door, based on information sensed by at least one of the door sensor, the door lock sensor, or the combination thereof.

In addition, the sensor 120 may include a seat belt sensor to sense whether a seat belt is fastened, or a pressure sensor to sense the weight of an occupant. The processor 160 may determine whether the occupant takes a seat, based on information sensed by at least one of the seat belt sensor, the pressure sensor, or any combination thereof.

The input device 130 may receive an input corresponding to at least one of a touch of a driver, action, an operation, or the voice of the driver, or the combination thereof and may transmit the input to the processor 160. The processor 160 may control the operation of the vehicle to corresponding to the input information. According to an embodiment, the input device 130 may include a touch-type input device or a mechanical input device. The more details thereof will be described with reference to FIG. 2.

Figure 2:
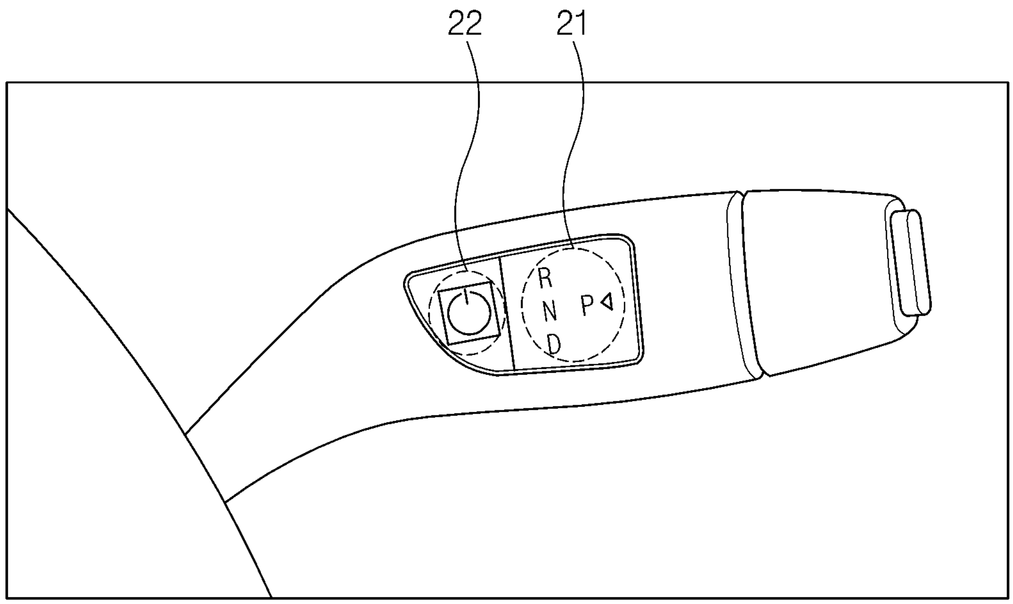
FIG. 2 is a view schematically illustrating an input device, according to an embodiment of the present disclosure.

FIG. 2 is a view schematically the input device, according to an embodiment of the present device.

As illustrated in FIG. 2, the input device 130 may be realized with a lever in a column type disposed at one region of the steering wheel. According to an embodiment, the driver may manipulate the input device 130 with a finger while holding the steering wheel. According to an embodiment, the lever in the column type may have a function 21 for electronic gear shifting, and may include a start button 22.

The output device 140 may output an image or a sound under the control of the processor 160. According to an embodiment, the output device 140 may be realized using a display device or a sound output device. According to an embodiment, the display device may include an instrument cluster, a dashboard, a center Fascia, and a console box of the vehicle. The display device may be realized with a display that employs a liquid crystal display (LCD) panel, a light emitting diode (LED) panel, an organic light emitting diode (OLED) panel, or a plasma display panel (PDP). The LCD may include a thin film transistor-LCD (TFT-LCD). The display device may be integrally implemented through a touch screen panel (TSP)

The memory 150 may store at least one algorithm to compute or execute various instructions for the operation of the vehicle control device according to an embodiment of the present disclosure. According to an embodiment, the memory 150 may store at least one instruction executed by the processor 160, and the instruction may allow the vehicle control apparatus to operate according to an embodiment. The memory 150 may be implemented with at least one of storage media of a flash memory, a hard disk, a memory card, a read-only memory (ROM), a random access memory (RAM), an electrically erasable and programmable (EEPROM), a magnetic memory, a magnetic disk, or an on optical disk.

The processor 160 may be implemented by various processing devices, such as a microprocessor embedded therein with a semiconductor chip to operate or execute various instructions, and may control the vehicle control apparatus according to an embodiment. The processor 160 may be electrically connected to the communication device 110, the sensor 120, the input device 130, the output device 140, and the memory 150 through a wired cable or various circuits to transmit an electrical signal including a control command to execute an arithmetic operation or data processing related to a control operation and/or communication. The processor 160 may include at least one of a central processing unit, an application processor, a communication processor (CP), or the combination thereof.

The processor 160 may determine whether the door is unlocked by the mechanical key, based on information on the door. In this case, the details of the mechanical key will be described with reference to FIG. 3.

Figure 3:
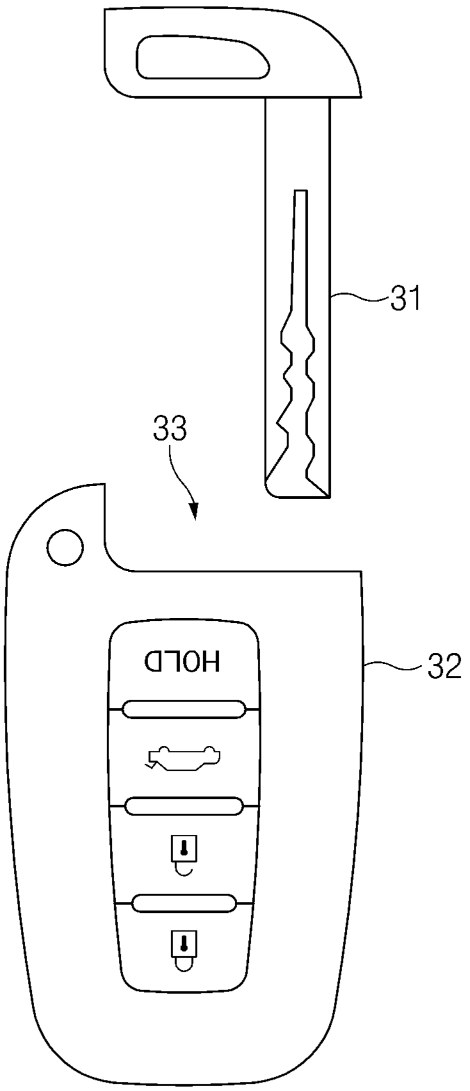
FIG. 3 is a view illustrating a mechanical key, according to an embodiment of the present disclosure.

FIG. 3 is a view illustrating a mechanical key, according to an embodiment of the present device.

As illustrated in FIG. 3, a mechanical key 31 may be provided to be coupled to a mechanical key hole 33 provided in the key fob 32. When the mechanical key 31 is separated from the key fob 32, inserted into a door key hole provided in at one side of the door of the vehicle, and turned, the door may be locked or unlocked. When the door is unlocked, after the mechanical key 31 is separated from the key fob 32, inserted into the door key hole provided in at one side of the door of the vehicle, and turned, the processor 160 may determine the door as being unlocked by the mechanical key 31. When determining the door as being unlocked by the mechanical key 31, the processor 160 may determine that authentication information for the key fob is difficult to be received from the key fob. Accordingly, the processor 160 may not determine that the door is remotely unlocked or the start is remotely controlled.

The processor 160 may determine whether the door is open, after determining the door as being unlocked by the mechanical key 31.

The processor 160 may determine whether an occupant seated is sensed at a driver seat, after determining the door as being open.

The processor 160 may determine that the occupant is in the state for starting an engine at the driver seat, when it is determined that the occupant seated is sensed at the driver seat. Accordingly, the processor 160 may output an announcement message for an emergency start. The details thereof will be described with reference to FIG. 4.

Figure 4:
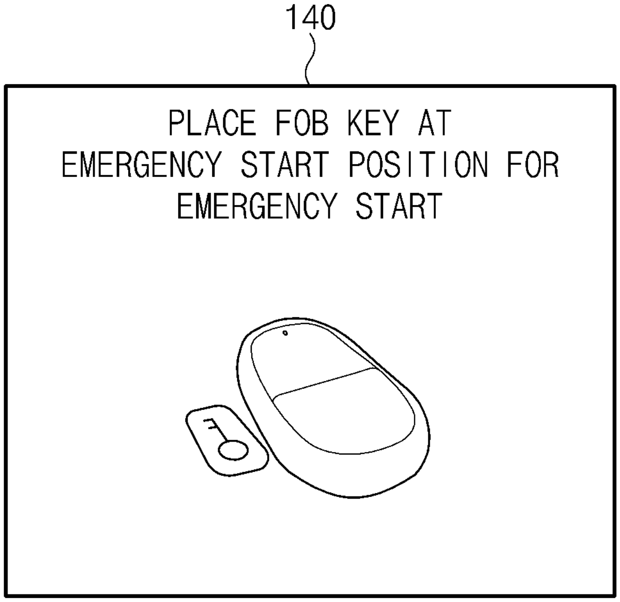
FIG. 4 is a view illustrating a screen for outputting an announcement message for an emergency start, according to an embodiment of the present disclosure.

FIG. 4 is a view illustrating a screen for outputting an announcement message for an emergency start, according to an embodiment of the present disclosure.

As illustrated in FIG. 4, the processor 160 may output an announcement message for the emergency start through the output device 140. According to an embodiment, the processor 160 may output an announcement message of "Place a key fob at an emergency start position for emergency start. In this case, the emergency start position may refer to a mounting position for the key fob for the emergency start. According to an embodiment, the emergency start position may include a position for an immobilizer coil. The details thereof will be described with reference to FIG. 5.

Figure 5:
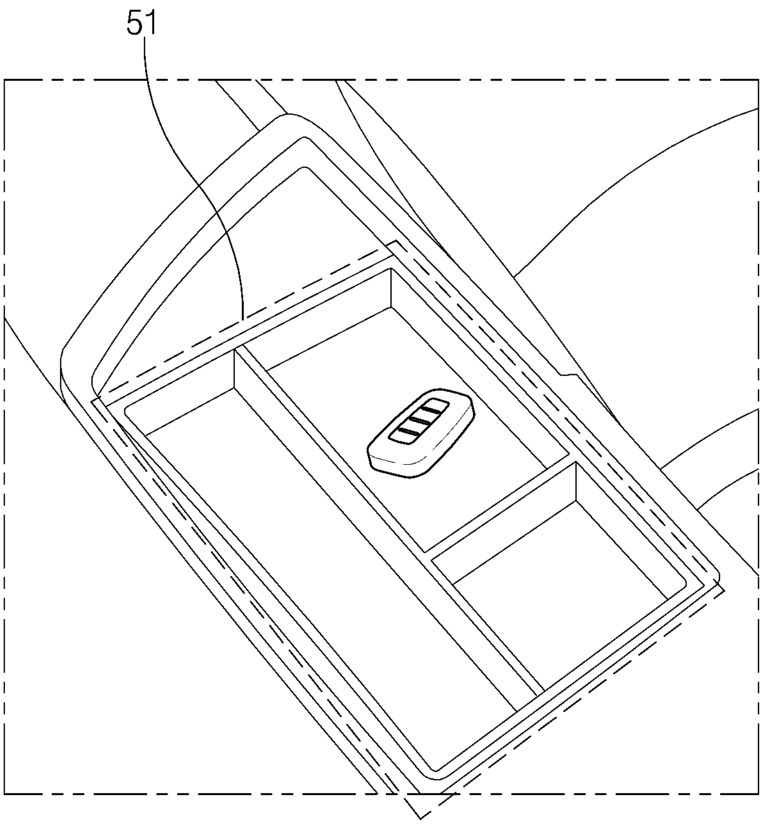
FIG. 5 is a view schematically illustrating a position for mounting a key fob, according to an embodiment of the present disclosure.

FIG. 5 is a view schematically illustrating the mounting position for the key fob, according to an embodiment of the present device.

As illustrated in FIG. 5, the mounting position for the key fob for the emergency start may be set to an upper portion of a vehicle console box 51, and the immobilizer coil may be provided at a lower portion of the vehicle console box 51 to operate the key fob of the vehicle. However, the present disclosure is not limited thereto. For example, various positions may be set as the mounting position for the key fob for the emergency start, as long as the positions are positions for disposing the immobilizer coil to operate the key fob of the vehicle.

The processor 160 may apply power to the immobilizer coil, when the announcement message for the emergency start is output. When the power is applied to the immobilizer coil, the immobilizer coil may operate the transponder to transmit authentication information for the key fob.

The processor 160 may determine whether the key fob is recognized at the emergency start position. The processor 160 may determine that the transponder of the key fob is in the state for transmitting the authentication information for the key fob, as the transponder of the key fob operates by the immobilizer coil applied with the power, when the key fob is sensed at the emergency start position. The processor 160 may authenticate the key fob, based on the received authentication information, when receiving the authentication information for the key fob from the transponder of the key fob, and may determine that the key fob is recognized when the authentication is completed.

The processor 160 may determine whether the start button is manipulated (pressed) by the occupant. The processor 160 may control to start an engine (to perform the emergency start) of the vehicle, when the start button is determined as being manipulated (pressed), as the start button is manipulated by the occupant.

According to an embodiment of the present disclosure, the processor 160 may output a theft warning, in the form of any one of an image, a sound or the combination thereof, through the output device 140, when the door is determined as being unlocked by the mechanical key and then open, and may transmit a message related to the theft to at least one of a terminal, a server, or the combination thereof. The message related to the theft will be described with reference to FIG. 6.

Figure 6:
FIG. 6 is a view illustrating a screen for outputting a message related to theft, according to an embodiment of the present disclosure.

FIG. 6 is a view illustrating a screen for outputting a message related to theft, according to an embodiment of the present disclosure;

As illustrated in FIG. 6, when the processor 160 transmits a message related to a theft to at least one of the terminal, the server, or the combination thereof, the terminal may receive the message related to the theft from the processor 160 and may output the message. According to an embodiment, the terminal may output a message of "Theft has been sensed in your vehicle. If you have recognized it, please press URL below".

According to an embodiment, the processor 160 may determine whether an occupant seated is sensed at a driver seat, when a vehicle owner is verified within a specific time through the URL output through the terminal.

Meanwhile, the processor 160 may terminate the operation, when the verification of the vehicle owner is not completed through the URL output through the terminal. According to another embodiment, the processor 160 may output, through the output device 140, the message for authenticating the vehicle owner, when the verification of the vehicle owner is not completed through the URL output through the terminal. The details thereof will be described with reference to FIG. 7.

Figure 7:
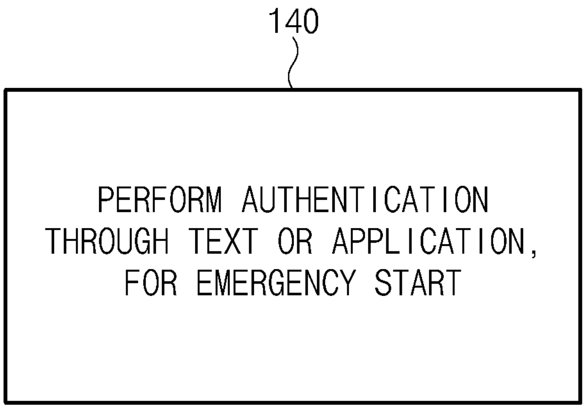
FIG. 7 is a view illustrating a screen for outputting a message for authenticating a vehicle owner, according to an embodiment of the present disclosure.

FIG. 7 is a view illustrating a screen for outputting a message for authenticating the vehicle owner, according to an embodiment of the present disclosure.

As illustrated in FIG. 7, the processor 160 may output, through the output device 140, an authentication message for authenticating the vehicle owner. According to an embodiment, the processor 160 may output a message of "perform authentication through a text or an application, for emergency start". The processor 160 may receive a message for indicating authentication complemented from the terminal, when the authentication is completed through the text or the app from the vehicle owner. The processor 160 may determine that the vehicle owner is verified within a specific time, when the message for indicating the authentication completed is received from the terminal within the specific time, after outputting the authentication message.

The processor 160 may control to start an engine (to perform the emergency start) of the vehicle, when the vehicle owner is verified within the specific time, and the start button is determined as being turned on.

Figure 8:
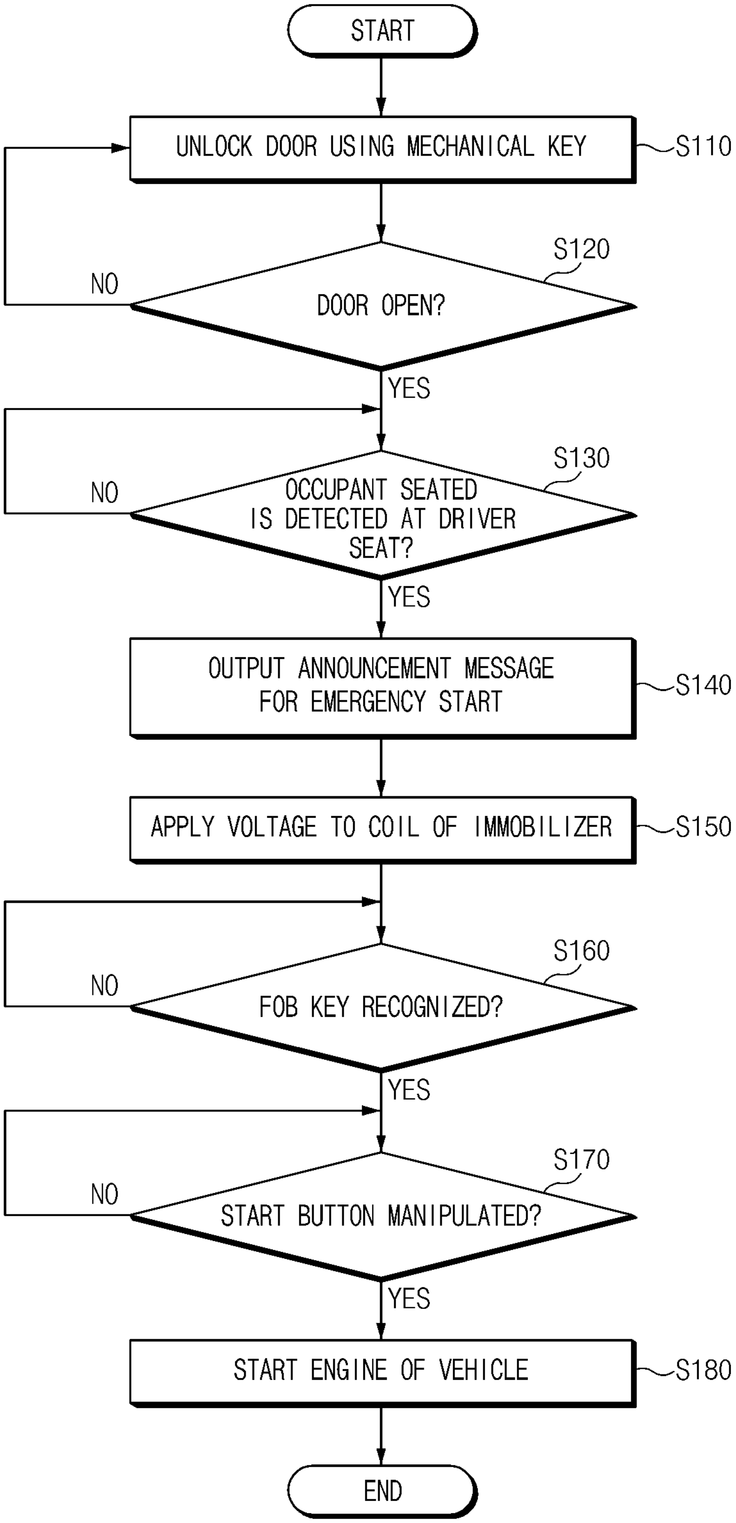
FIGS. 8 to 10 are views illustrating a method for controlling a vehicle, according to an embodiment of the present disclosure.
Figure 9:
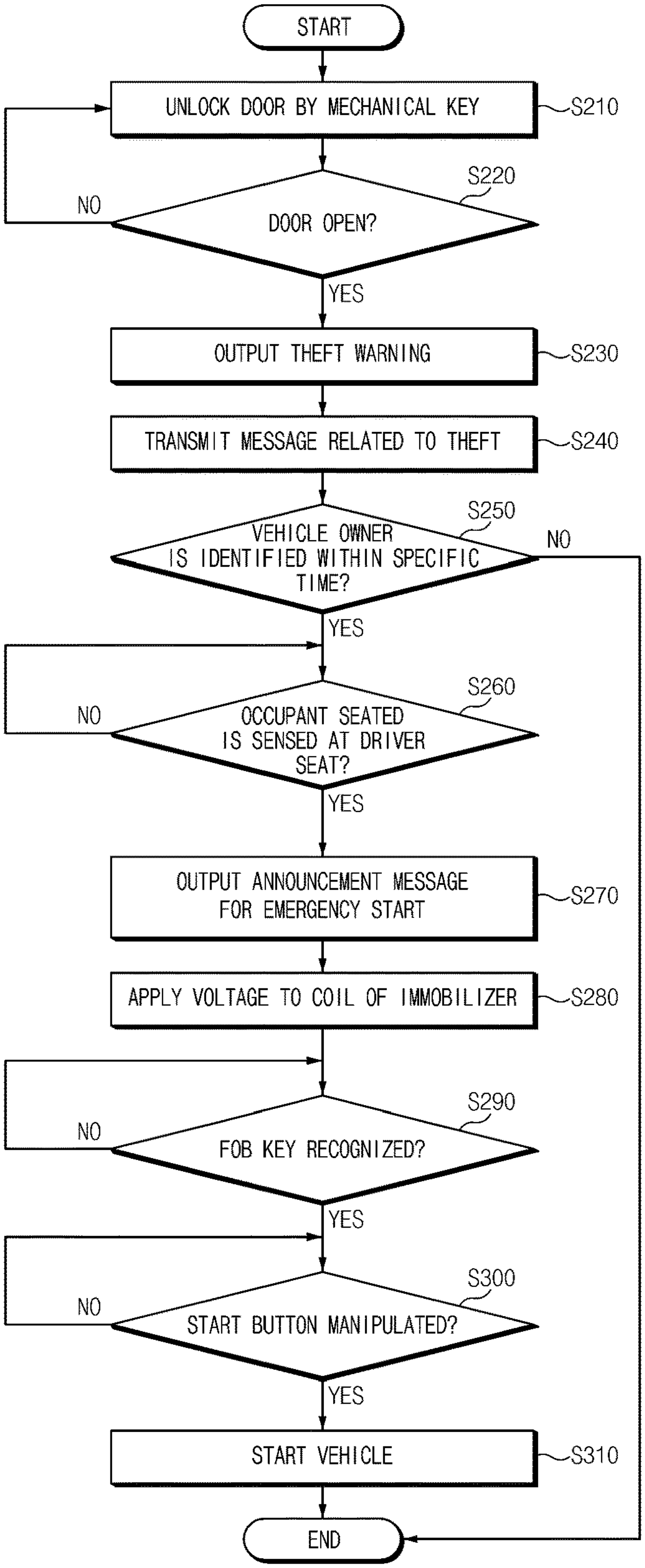
Figure 10:
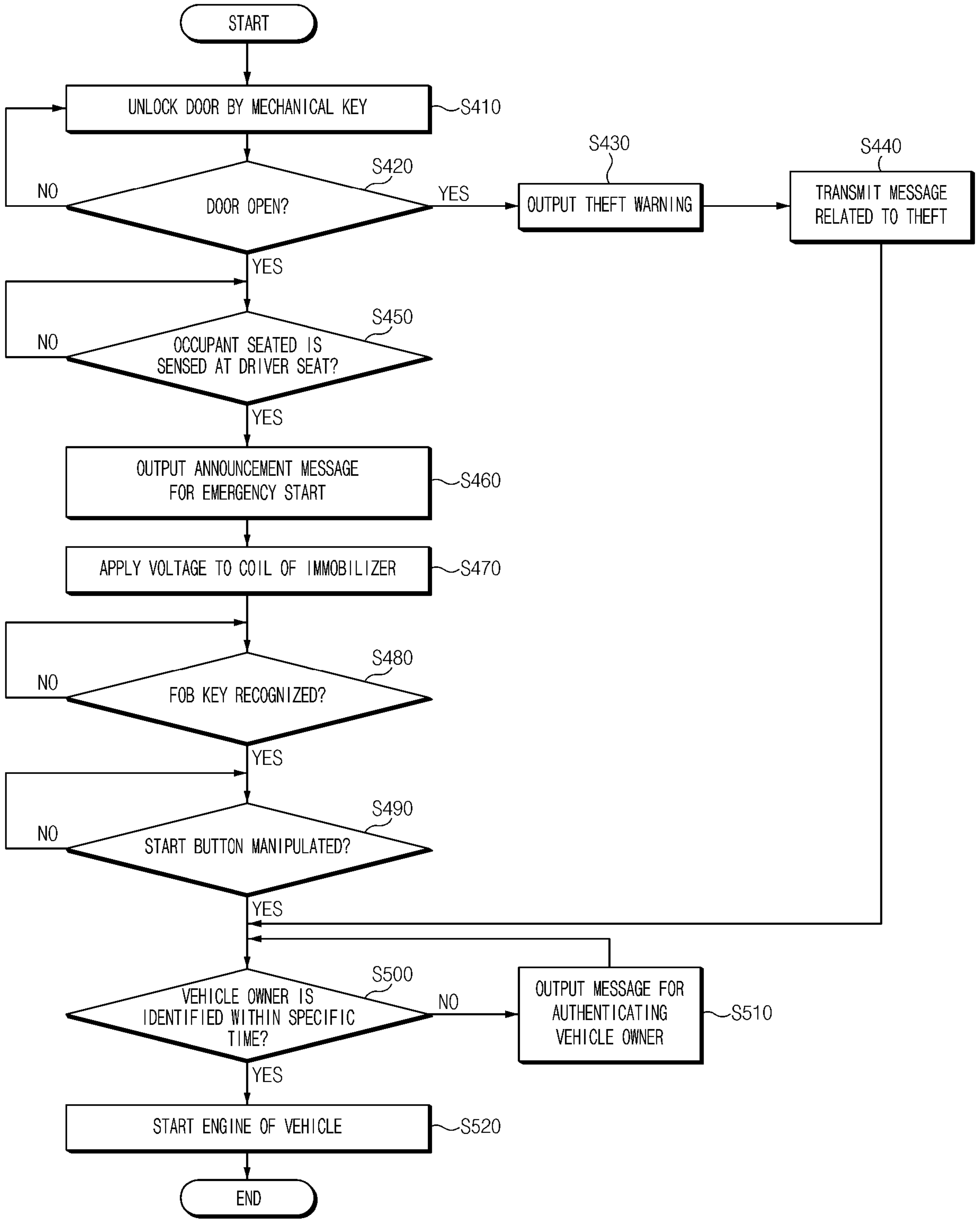

FIGS. 8 to 10 are views illustrating a method for controlling a vehicle, according to an embodiment of the present disclosure.

As illustrated in FIG. 8, the mechanical key may be provided to be coupled to a mechanical key hole provided in the key fob. When the mechanical key is separated from the key fob, inserted into a door key hole provided in at one side of the door of the vehicle, and turned, the door may be locked or unlocked. When the door is unlocked, after the mechanical key is separated from the key fob 32, inserted into the door key hole provided in at one side of the door of the vehicle, and turned, the processor 160 may determine the door as being unlocked by the mechanical key (S110).

When determining the door as being unlocked by the mechanical key in S110, the processor 160 may determine that authentication information for the key fob is difficult to be received from the key fob. Accordingly, the processor 160 may not determine that the door is remotely unlocked or the start is remotely controlled.

The processor 160 may determine whether the door is open (S120), after determining the door as being unlocked by the mechanical key.

The processor 160 may determine whether an occupant seated is sensed at a driver seat (S130), after determining the door as being open in S120.

The processor 160 may determine that the occupant is in the state for starting an engine at the driver seat, when it is determined that the occupant seated is sensed at the driver seat in S130. Accordingly, the processor 160 may output an announcement message for an emergency start (S140).

According to an embodiment, the processor 160 may output an announcement message of "Place a key fob at an emergency start position for emergency start through the output device 140 in S140. In this case, the emergency start position may refer to a mounting position for the key fob for the emergency start. According to an embodiment, the emergency start position may include a position for an immobilizer coil.

According to an embodiment, the mounting position for the key fob for the emergency start may be set to an upper portion of a vehicle console box, and the immobilizer coil may be provided at a lower portion of the vehicle console box to operate the key fob of the vehicle. However, the present disclosure is not limited thereto. For example, various positions may be set as the mounting position for the key fob for the emergency start, as long as the positions are positions for disposing the immobilizer coil to operate the key fob of the vehicle.

The processor 160 may apply power to the immobilizer coil, when the announcement message for the emergency start is output (S150). When the power is applied to the immobilizer coil, the immobilizer coil may operate the transponder to transmit authentication information for the key fob.

The processor 160 may determine whether the key fob is recognized at the emergency start position (S160). The processor 160 may determine that the transponder of the key fob is in the state for transmitting the authentication information for the key fob, as the transponder of the key fob operates by the immobilizer coil applied with the power, when the key fob is sensed at the emergency start position. The processor 160 may authenticate the key fob, based on the received authentication information, when receiving the authentication information for the key fob from the transponder of the key fob, and may determine that the key fob is recognized when the authentication is completed.

The processor 160 may determine whether the start button is manipulated by the occupant (S170), when the key fob is determined as being recognized. The processor 160 may control to start an engine (to perform the emergency start) of the vehicle (S180), when the start button is determined as being manipulated (pressed), as the start button is manipulated by the occupant.

As illustrated in FIG. 9, the mechanical key may be provided to be coupled to a mechanical key hole provided in the key fob. When the mechanical key is separated from the key fob, inserted into a door key hole provided in at one side of the door of the vehicle, and turned, the door may be locked or unlocked. When the door is unlocked, after the mechanical key is separated from the key fob, inserted into the door key hole provided in at one side of the door of the vehicle, and turned, the processor 160 may determine the door as being unlocked by the mechanical key (S210).

When determining the door as being unlocked by the mechanical key in S210, the processor 160 may determine that authentication information for the key fob is difficult to be received from the key fob. Accordingly, the processor 160 may not determine that the door is remotely unlocked or the start is remotely controlled.

The processor 160 may determine whether the door is open (S220), after determining the door as being unlocked by the mechanical key.

The processor 160 may output a theft warning, in the form of any one of an image, a sound or the combination thereof, through the output device 140, when the door is determined as being unlocked by the mechanical key and then open (S230).

The processor 160 may transmit a message related to the theft to at least one of a terminal, a server, or the combination thereof (S240).

When the processor 160 transmits the message related to the theft to at least one of the terminal, the server, or the combination thereof, the terminal may receive the message related to the theft from the processor 160 and may output the message. According to an embodiment, the terminal may output a message of "Theft has been sensed in your vehicle. If you have recognized it, please press URL below".

The processor 160 may determine whether the verification of the vehicle owner is completed, within a specific time through the URL output through the terminal (S250).

The processor 160 may determine whether an occupant seated is sensed at a driver seat, after the verification of the vehicle owner is completed (S260).

The processor 160 may determine that the occupant is in the state for starting an engine at the driver seat, when it is determined that the occupant seated is sensed at the driver seat in S260. Accordingly, the processor 160 may output an announcement message for an emergency start (S270).

According to an embodiment, the processor 160 may output an announcement message of "Place a key fob at an emergency start position for emergency start through the output device 270 in S240. In this case, the emergency start position may refer to a mounting position for the key fob for the emergency start. According to an embodiment, the emergency start position may include a position for an immobilizer coil. According to an embodiment, the mounting position for the key fob for the emergency start may be set to an upper portion of a vehicle console box, and the immobilizer coil may be provided at a lower portion of the vehicle console box to operate the key fob of the vehicle. However, the present disclosure is not limited thereto. For example, various positions may be set as the mounting position for the key fob for the emergency start, as long as the positions are positions for disposing the immobilizer coil to operate the key fob of the vehicle.

The processor 160 may apply power to the immobilizer coil, when the announcement message for the emergency start is output (S280). When the power is applied to the immobilizer coil, the immobilizer coil may operate the transponder to transmit authentication information for the key fob.

The processor 160 may determine whether the key fob is recognized at the emergency start position (S290). The processor 160 may determine that the transponder of the key fob is in the state for transmitting the authentication information for the key fob, as the transponder of the key fob operates by the immobilizer coil applied with the power, when the key fob is sensed at the emergency start position. The processor 160 may authenticate the key fob, based on the received authentication information, when receiving the authentication information for the key fob from the transponder of the key fob, and may determine that the key fob is recognized when the authentication is completed.

The processor 160 may determine whether the start button is manipulated by the occupant (S300), when the key fob is determined as being recognized. The processor 160 may control to start an engine (to perform the emergency start) of the vehicle (S310), when the start button is determined as being manipulated (pressed), as the start button is manipulated by the occupant.

As illustrated in FIG. 10, the mechanical key may be provided to be coupled to a mechanical key hole provided in the key fob. When the mechanical key is separated from the key fob, inserted into a door key hole provided in at one side of the door of the vehicle, and turned, the door may be locked or unlocked. When the door is unlocked, after the mechanical key is separated from the key fob, inserted into the door key hole provided in at one side of the door of the vehicle, and turned, the processor 160 may determine the door as being unlocked by the mechanical key (S410).

When determining the door as being unlocked by the mechanical key in S410, the processor 160 may determine that authentication information for the key fob is difficult to be received from the key fob. Accordingly, the processor 160 may not determine that the door is remotely unlocked or the start is remotely controlled.

The processor 160 may determine whether the door is open (S420), after determining the door as being unlocked by the mechanical key.

The processor 160 may output a theft warning, in the form of any one of an image, a sound or the combination thereof, through the output device 140, when the door is determined as being unlocked by the mechanical key and then open in S420 (S430).

The processor 160 may transmit a message related to the theft to at least one of a terminal, a server, or the combination thereof (S440). When the processor 160 transmits the message related to the theft to at least one of the terminal, the server, or the combination thereof, the terminal may receive the message related to the theft from the processor 160 and may output the message. According to an embodiment, the terminal may output a message of "Theft has been sensed in your vehicle. If you have recognized it, please press URL below".

The processor 160 may determine whether the occupant seated is sensed at the driver seat (S450) while outputting the theft warning, when the door is determined as being open, after determining the door as being unlocked by the mechanical key.

The processor 160 may determine that the occupant is in the state for starting an engine at the driver seat, when it is determined that the occupant seated is sensed at the driver seat in S450. Accordingly, the processor 160 may output an announcement message for an emergency start (S460).

According to an embodiment, the processor 160 may output an announcement message of "Place a key fob at an emergency start position for emergency start through the output device 460 in S460. In this case, the emergency start position may refer to a mounting position for the key fob for the emergency start. According to an embodiment, the emergency start position may include a position for an immobilizer coil. According to an embodiment, the mounting position for the key fob for the emergency start may be set to an upper portion of a vehicle console box, and the immobilizer coil may be provided at a lower portion of the vehicle console box to operate the key fob of the vehicle. However, the present disclosure is not limited thereto. For example, various positions may be set as the mounting position for the key fob for the emergency start, as long as the positions are positions for disposing the immobilizer coil to operate the key fob of the vehicle.

The processor 160 may apply power to the immobilizer coil, when the announcement message for the emergency start is output (S470). When the power is applied to the immobilizer coil, the immobilizer coil may operate the transponder to transmit authentication information for the key fob.

The processor 160 may determine whether the key fob is recognized at the emergency start position (S480). The processor 160 may determine that the transponder of the key fob is in the state for transmitting the authentication information for the key fob, as the transponder of the key fob operates by the immobilizer coil applied with the power, when the key fob is sensed at the emergency start position. The processor 160 may authenticate the key fob, based on the received authentication information, when receiving the authentication information for the key fob from the transponder of the key fob, and may determine that the key fob is recognized when the authentication is completed.

The processor 160 may determine whether the start button is manipulated by the occupant (S490), when the key fob is determined as being recognized.

The processor 160 may determine whether the verification of the vehicle owner is completed, within a specific time through the URL transmitted through the terminal in S440 (S500), when it is determined that the start button is manipulated by the occupant and determined as being manipulated.

According to another embodiment, the processor 160 may output, through the output device 140, the message for authenticate the vehicle owner (S510), when the verification of the vehicle owner is not completed through the URL output through the terminal in S500.

According to an embodiment, the processor 160 may output a message of "perform authentication through a text or an application, for emergency start" in S510. The processor 160 may receive a message for indicating authentication complemented from the terminal, when the authentication is complemented through the text or the app from the vehicle owner. The processor 160 may determine that the vehicle owner is verified within a specific time, when the message for indicating the authentication completed is received from the terminal within the specific time, after outputting the authentication message.

The processor 160 may control to start an engine (to perform the emergency start) (S520), when it is determined that the verification of the vehicle owner is completed in S500.

Figure 11:
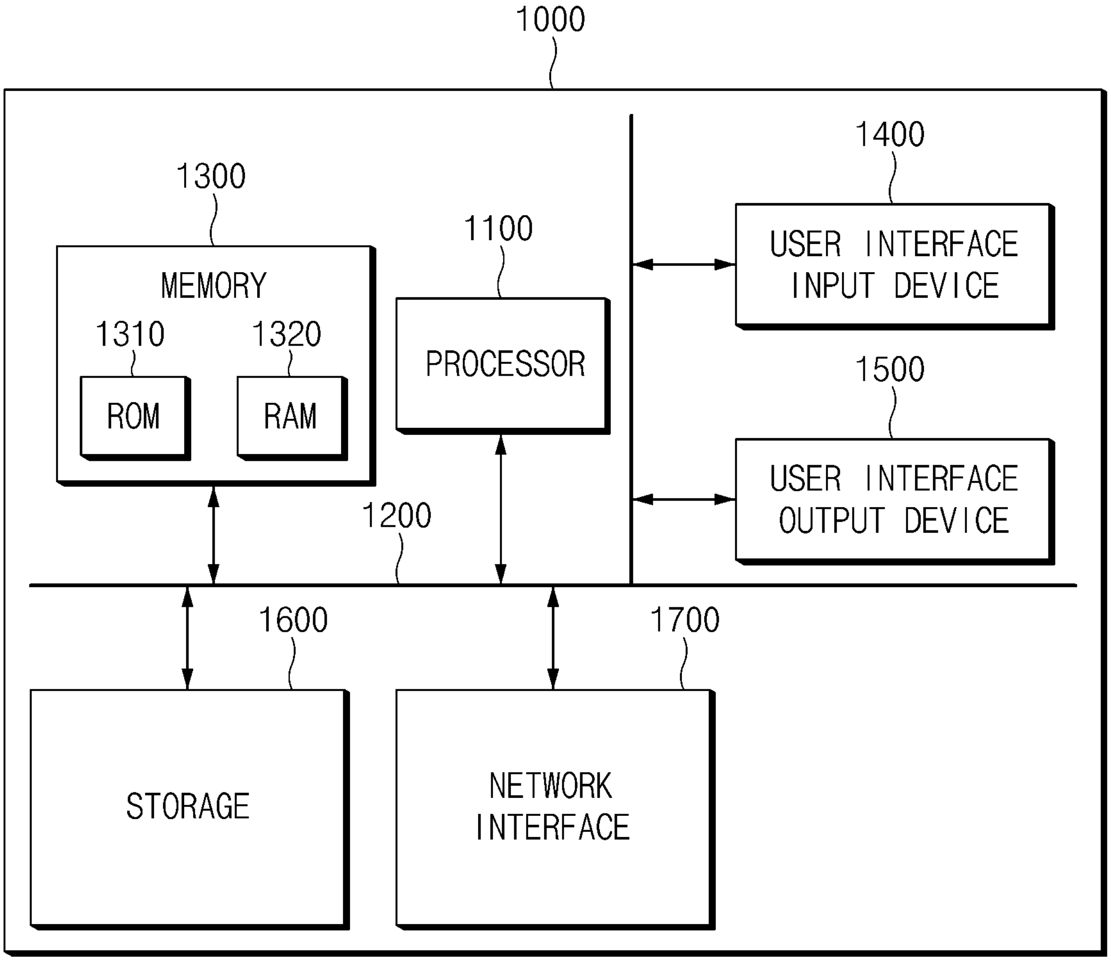
FIG. 11 is a view illustrating the configuration of a computing system to execute the method according to an embodiment of the present disclosure.

FIG. 11 is a view illustrating the configuration of a computing system to execute the method according to an embodiment of the present disclosure.

Referring to FIG. 11, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM) (see 1320).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an embodiment of the present disclosure, in the apparatus and the method for controlling the vehicle, power may be applied to an immobilizer coil, when the occupant condition of the occupant is satisfied in the vehicle in which the start button is applied to the electronic shift-by-wire (SBW) lever in the column type, such that the key fob is recognized, thereby performing the emergency start.

According to an embodiment of the present disclosure, in the apparatus and a method for controlling the vehicle, the theft warning may be output, and the message related to the theft may be transmitted, such that the vehicle owner perceives a vehicle state, when the door is unlocked by the mechanical key in the vehicle in which the start button is applied to the electronic shift-by-wire (SBW) lever in the column type.

According to an embodiment of the present disclosure, in the apparatus and the method for controlling a vehicle, the emergency start may be performed only when the verification of the vehicle owner is completed by outputting the theft warning, and of transmitting the message related to the theft, in the situation that the door is unlocked by the mechanical key in the vehicle in which the start button is applied to an electronic shift-by-wire (SBW) lever in a column type and the door is open.

The above description is merely an example of the technical idea of the present disclosure, and various modifications and modifications may be made by one skilled in the art without departing from the essential characteristic of the invention.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a vehicle, the apparatus comprising:

at least one sensor configured to acquire information related to a door and information related to a seat; and a processor configured to unlock the door by a mechanical key, determine the door as being open based on the information related to the door, and apply power to an immobilizer coil to recognize a key fob that includes the mechanical key, when determining an occupant seated as being sensed at a driver seat, based on the information related to the seat, wherein the processor is further configured to:

transmit a message related to theft of the vehicle, and determine that verification of a vehicle owner is completed upon receiving a response, through a terminal, to the message related to the theft of the vehicle;

output a message for verification of the occupant as the vehicle owner when the verification of the vehicle owner is not completed through the terminal;

receive a message for indicating authentication is completed from the terminal through a text or an application based on the message for verification of the occupant; and determine that the vehicle owner is verified upon receiving the message indicating authentication is completed from the terminal.

2. The apparatus of claim 1, wherein the mechanical key is provided in the key fob, and configured to be inserted into a key inserting hole of the vehicle and then turned, such that the door is unlocked.

3. The apparatus of claim 1, wherein the processor is configured to:

output an announcement message for an emergency start, when the occupant seated is sensed at the driver seat.

4. The apparatus of claim 1, wherein the processor is configured to:

determine whether a start button is input, when the key fob is determined as being recognized, as power is applied to the immobilizer coil.

5. The apparatus of claim 4, wherein the start button is provided in an electronic Shift by Wire (SBW) lever in a column type, which is provided at one side of a steering wheel.

6. The apparatus of claim 4, wherein the processor is configured to:

control to start an engine, when the start button is determined as being input.

7. The apparatus of claim 1, wherein the processor is configured to:

output a theft warning for the vehicle, when the door is determined as being unlocked by the mechanical key and then opened, and transmit a message related to the theft to at least one of the terminal or a server.

8. The apparatus of claim 7, wherein the processor is configured to:

determine whether the verification of the vehicle owner is completed within a specific time, after the message related to the theft is transmitted.

9. The apparatus of claim 8, wherein the processor is configured to:

determine whether an engine of the vehicle is started, depending on whether the verification of the vehicle owner is completed.

10. A vehicle comprising the apparatus of claim 1.

11. A method for controlling a vehicle, the method comprising:

acquiring, by at least one sensor, information related to a door and information related to a seat;

unlocking the door by a mechanical key, determining the door as being open, based on the information related to the door, and applying power to an immobilizer coil to recognize a key fob, by a processor, when determining an occupant seated as being sensed at a driver seat, based on the information related to the seat;

transmitting, by the processor, a message related to theft of the vehicle, and determining that verification of a vehicle owner is completed upon receiving a response, through the terminal, to the message related to the theft of the vehicle;

outputting, by the processor, a message for verification of the occupant as the vehicle owner when the verification of the vehicle owner is not completed through the terminal;

receiving, by the processor, a message for indicating authentication is completed from the terminal through a text or an application based on the message for verification of the occupant; and determining, by the processor, that the vehicle owner is verified upon receiving the message indicating authentication is completed from the terminal.

12. The method of claim 11, wherein the mechanical key is provided in the key fob, and configured to be inserted into a key inserting hole of the vehicle and then turned, such that the door is unlocked.

13. The method of claim 11, further comprising:

outputting an announcement message for an emergency start, when the occupant seated is sensed at the driver seat.

14. The method of claim 11, further comprising:

determining whether a start button is input, when the key fob is determined as being recognized, as power is applied to the immobilizer coil.

15. The method of claim 14, wherein the start button is provided in an electronic Shift by Wire (SBW) lever in a column type, which is provided at one side of a steering wheel.

16. The method of claim 14, further comprising:

controlling to start an engine, when the start button is determined as being input.

17. The method of claim 11, further comprising:

outputting a theft warning for the vehicle, when the door is determined as being unlocked by the mechanical key and then open, and transmitting a message related to theft to at least one of the terminal, a server, or the combination thereof.

18. The method of claim 17, further comprising:

determining whether the verification of the vehicle owner is completed within a specific time, after the message related to the theft is transmitted.

19. The method of claim 18, further comprising:

determining whether an engine of the vehicle is started, depending on whether the verification of the vehicle owner is completed.

* * * * *